United States Patent
Wu (10) Patent No.: US 12,013,857 B2
(45) Date of Patent: Jun. 18, 2024

(54) IDENTIFYING HOT ITEMS IN A DISTRIBUTED STORAGE SYSTEM

(71) Applicant: Seagate Technology LLC, Fremont, CA (US)

(72) Inventor: Sining Wu, Chichester (GB)

(73) Assignee: Seagate Technology LLC, Fremont, CA (US)

( * ) Notice: Subject to any disclaimer, the term of this patent is extended or adjusted under 35 U.S.C. 154(b) by 182 days.

(21) Appl. No.: 17/587,271

(22) Filed: Jan. 28, 2022

(65) Prior Publication Data

US 2023/0244669 A1    Aug. 3, 2023

(51) Int. Cl.
*G06F 16/2455* (2019.01)
*G06F 16/185* (2019.01)
*G06F 16/22* (2019.01)

(52) U.S. Cl.
CPC ...... *G06F 16/24553* (2019.01); *G06F 16/185* (2019.01); *G06F 16/2246* (2019.01)

(58) Field of Classification Search
CPC ................. G06F 3/0685; G06F 16/185; G06F 16/1827; G06F 16/2246; G06F 16/24553
See application file for complete search history.

(56) References Cited

U.S. PATENT DOCUMENTS

| | | | |
|---|---|---|---|
| 7,415,608 B2 | 8/2008 | Bolosky et al. | |
| 9,268,796 B2 | 2/2016 | Pope et al. | |
| 9,507,833 B2 | 11/2016 | Guirguis et al. | |
| 10,176,212 B1 * | 1/2019 | Prohofsky | G06F 16/2365 |
| 10,248,476 B2 | 4/2019 | Cairns | |
| 10,523,756 B1 * | 12/2019 | Chakraborty | G06F 3/0685 |
| 10,553,038 B2 | 2/2020 | De La Mora Molina et al. | |
| 10,726,009 B2 | 7/2020 | Pal et al. | |

(Continued)

FOREIGN PATENT DOCUMENTS

| | | |
|---|---|---|
| JP | 2007104716 A | 4/2007 |
| JP | 2020048182 A | 3/2020 |
| WO | WO-2021262155 A1 * | 12/2021 |

OTHER PUBLICATIONS

B. Beyer, C. Jones, J. Petoff and N. R. Murphy, "Site Reliability Engineering: How Google Runs Production Systems," Chapter 6—Monitoring Distributed Storage Systems, https://sre.google/sre-book/monitoring-distributed-systems/, 2016, 17 pages.

(Continued)

*Primary Examiner* — James E Richardson
(74) *Attorney, Agent, or Firm* — Westman, Champlin & Koehler, P.A.

(57) ABSTRACT

A query is received in a distributed storage system that asks for frequently accessed items of a select storage tier in a service store. The query is executed on at least one data summary structure maintained by a client node that corresponds with the select storage tier in the service store. Each data summary structure maintained by the client node summarizes a data stream of item access of the select storage tier during a period of time and different data summary structures from different periods of time are periodically merged so that the query is conducted on a merged data summary structure maintained by the client node. A result is returned from the executed query that is indicative of frequently accessed items of the select storage tier in the service store.

20 Claims, 5 Drawing Sheets

(56) References Cited

U.S. PATENT DOCUMENTS

| | | | |
|---|---|---|---|
| 2015/0149611 A1 | 5/2015 | Lissack | |
| 2018/0046383 A1* | 2/2018 | Gates | G06F 3/0644 |
| 2018/0136838 A1* | 5/2018 | White | G06F 3/0647 |
| 2019/0385453 A1* | 12/2019 | Dorne | G07C 5/008 |
| 2020/0025768 A1 | 1/2020 | Kagamu | |
| 2020/0133543 A1* | 4/2020 | Singh | G06F 3/0634 |

OTHER PUBLICATIONS

P. Carns, R. Latham, R. Ross, K. Iskra, S. Lang and K. Riley, "24/7 Characterization of petascale I/O workloads," 2009 IEEE International Conference on Cluster Computing and Workshops, Aug.-Sep. 2009, New Orleans, LA, USA, pp. 1-10, 10 pages.

G. Cormode and S. Muthukrishnan, "An improved data stream summary: The Count-Min sketch and its applications," Journal of Algorithms, vol. 55, Issue 1, Apr. 2005, pp. 58-75, 18 pages.

Graham Cormode and S. Muthukrishnan. 2005. What's hot and what's not: tracking most frequent items dynamically. chrome-extension://efaidnbmnnnibpcajpcglclefindmkaj/viewer.html?pdfurl=http%3A%2F%2Fdimacs.rutgers.edu%2F~graham%2F%2Fpubs%2Fpapers%2Fwhatshot-tods.pdf&clen=334057&chunk=true, ACM Trans. on Database Syst. vol. 30, No. 1, Mar. 2005, pp. 249-278, 29 pages.

DataSketches, "The Business Challenge: Analyzing Big Data Quickly," https://datasketches.apache.org/, at least as early as Jan. 18, 2022, 3 pages.

John R. Douceur and William J. Bolosky. A Large-Scale Study of File-System Contents.chrome-extension://efaidnbmnnnibpcajpcglclefindmkaj/viewer.html?pdfurl=https%3A%2F%2Fwww.microsoft.com%2Fen-us%2Fresearch%2Fwp-content%2Fuploads%2F1999%2F01%2FSigmetrics1999.pdf&clen=244486, Sigmetrics '99, Atlanta, GA, USA, May 1999, 12 pages.

Anna C. Gilbert, Yannis Kotidis, S. Muthukrishnan, and Martin J. Strauss. 2002. How to summarize the universe: dynamic maintenance of quantiles. In Proceedings of the 28th international conference on Very Large Data Bases (VLDB '02), Hong Kong, China, Aug. 2002, 454-465, 12 pages.

Github, "Cortx-motr," https://github.com/Seagate/cortx-motr, at least as early as Jan. 18, 2022, 3 pages.

GitHub, "Maestro IO Interface: a higher-level API to the CORX internal motr interface," https://github.com/Seagate/cortx-mio, at least as early as Jan. 18, 2022, 4 pages.

Jen-Wei Hsieh, Tei-Wei Kuo, and Li-Pin Chang. 2006. Efficient identification of hot data for flash memory storage systems. chrome-extension://efaidnbmnnnibpcajpcglclefindmkaj/viewer.html?pdfurl=https%3A%2F%2Fpeople.engr.tamu.edu%2Fajiang%2FHotData.pdf&clen=557227, ACM Trans. on Storage col. 2, Issue 1, Feb. 2006, pp. 22-40, 19 pages.

Z. Karnin, K. Lang and E. Liberty, "Optimal Quantile Approximation in Streams," 2016 IEEE 57th Annual Symposium on Foundations of Computer Science (FOCS), Apr. 2016, New Brunswick, NJ, USA, pp. 71-78, 12 p.

Andrew W. Leung, Shankar Pasupathy, Garth Goodson, and Ethan L. Miller. Measurement and analysis of large-scale network file system workloads. chrome-extension://efaidnbmnnnibpcajpcglclefindmkaj/viewer.html?pdfurl=https%3A%2F%2Fwww.usenix.org%2Flegacy%2Fevent%2Fusenix08%2Ftech%2Ffull_papers%2Fleung%2Fleung.pdf&clen=539351&chunk=true, In USENIX 2008 Annual Technical Conference (ATC '08). USENIX Association, USA, Jun. 2008, Boston, MA, USA, pp. 213-226, 14 pages.

Glenn K. Lockwood, Shane Snyder, Teng Wang, Suren Byna, Philip Carns, and Nicholas J. Wright. 2018. A year in the life of a parallel file system. chrome-extension://efaidnbmnnnibpcajpcglclefindmkaj/viewer.html?pdfurl=https%3A%2F%2Fsdm.lbl.gov%2F~sbyna%2Fresearch%2Fpapers%2F201811-SC18-YearLifePFS.pdf&clen=473535&chunk=true, In Proceedings of the International Conference for High Performance Computing, Networking, Storage, and Analysis (SC '18), Nov. 2018, Dallas, TX, USA, 14 pages.

Charles Masson, Jee E. Rim, and Homin K. Lee. 2019. DDSketch: a fast and fully mergeable quantile sketch with relative-error guarantees. chrome-extension://efaidnbmnnnibpcajpcglclefindmkaj/viewer.html?pdfurl=https%3A%2F%2Fwww.vldb.org%2Fpvldb%2Fvol12%2Fp2195-masson.pdf&clen=622583&chunk=true, Proceedings of the VLDB Endow. 12, No. 12, Aug. 2019, 11 pages.

D. Park and D. H. C. Du, "Hot data identification for flash-based storage systems using multiple bloom filters," 2011 IEEE 27th Symposium on Mass Storage Systems and Technologies (MSST), May 2011, Denver, CO, USA, 11 pages.

Sage Storage, "A Unified Data Storage System Platform for AI, Deep Learning, Big Data Analysis and High Performance Computing," https://sagestorage.eu/, at least as early as Jan. 18, 2022, 4 pages.

B. Welch and G. Noer, "Optimizing a hybrid SSD/HDD HPC storage system based on file size distributions," 2013 IEEE 29th Symposium on Mass Storage Systems and Technologies (MSST), May 2013, Lake Arrowhead, CA, USA, 12 pages.

Wikipedia, "Count-min sketch," https://en.wikipedia.org/wiki/Count%E2%80%93min_sketch, at least early as Jan. 18, 2022, 4 pages.

Wikipedia, "Metadata," https://en.wikipedia.org/wiki/Metadata, at least as early as Jan. 18, 2022, 26 pages.

Wikipedia, "Object Storage," https://en.wikipedia.org/wiki/Object_storage, at least as early as Jan. 18, 2022, 10 pages.

Non-Final Rejection for U.S. Appl. No. 17/587,281, dated Dec. 7, 2023, 19 pages.

\* cited by examiner

IDENTIFYING HOT ITEMS IN A DISTRIBUTED STORAGE SYSTEM

SUMMARY

A method of identifying hot items in a distributed storage system is provided. The method includes receiving a query that asks for frequently accessed items of a select storage tier in a service store. The query is executed on at least one data summary structure maintained by a client node that corresponds with the select storage tier in the service store. Each data summary structure maintained by the client node summarizes a data stream of item access of the select storage tier during a period of time and different data summary structures from different periods of time are periodically merged so that the query is conducted on a merged data summary structure maintained by the client node. A result is returned from the executed query that is indicative of frequently accessed items of the select storage tier in the service store.

Another method of identifying hot items in a distributed storage system is provided. The method includes receiving queries that ask for frequently accessed items of one of a plurality of storage tiers in a service store. Each query is executed on at least one data summary structure maintained by one of a plurality of client nodes that corresponds with one of the plurality of storage tiers in the service store. Each client node is configured to maintain a set of data summary structures that summarize a data stream of access frequency of one of the select storage tiers during different periods of time and different data summary structure from different periods of time at each client node are periodically merged together so that each query asking for access frequency of one of the storage tiers is executed on a merged data summary structure. A result is returned from each executed query that are indicative of frequently accessed items of the plurality of storage tiers in the service store.

A distributed storage system includes a service store having a plurality of storage tiers and a plurality of client nodes each corresponding with one of the plurality of storage tiers in the service store. Each client node is configured to maintain at least one data summary structure that summarizes a data stream of access frequency of the corresponding storage tier during a period of time and different data summary structures from different periods of time are periodically merged so that a query asking for frequently accessed items of the corresponding storage tier is executed on a merged data summary structure maintained by the client node. Each client node is configured to return a result from the executed query that is indicative of frequently accessed items in the corresponding storage tier in the service store.

This summary is not intended to describe each disclosed embodiment or every implementation of identifying hot items in a distributed storage system as described herein. Many other novel advantages, features, and relationships will become apparent as this description proceeds. The figures and the description that follow more particularly exemplify illustrative embodiments.

DETAILED DESCRIPTION

Identifying hot items has been found useful in varied computing systems including, but not limited to, distributed storage systems. Hot items or hot data are data frequently accessed and transferred within a computing system. Hot data is always in demand and in transit, not stored for long periods of time, while cold data is data that is infrequently accessed and transferred within a computing system.

In regards to distributed storage systems, whether file systems or object-based data storage systems, hot item identification is also important, in particular, to data systems that are integrated with different data storage technologies or data storage tiers. For example, a distributed object storage system may organize objects into multiple data storage tiers or pools and each of the tiers or pools are configured with different storage technologies (e.g., non-volativle random access memory (NVRAM), solid state drives (SSD), hard disc drive (HDD)). These different storage technologies differ significantly in terms of performance, capacity, power consumption, durability and cost. As the number of objects grow, objects may migrate into different data storage tiers or pools. Hot objects may be moved into a better performing tiers or pools and cold objects may be moved into lower performing tiers or pools, but with higher capacity. Identifying hot objects is difficult. The object access frequency provides an index showing how active an object is during a specific period of time, but the index does not show how to store and manage object access frequency and identify hot objects using the frequency.

It is possible to store access frequency as a member of an object's metadata, but considering the number of objects in an object store, access frequency may potentially be very large and the throughput of object access may be extremely high. The overhead of maintaining access frequency as object metadata is forbiddingly large. Even if it is possible to reduce the overhead, querying frequently accessed items is still not an easy task. Simply setting a threshold may not be able to accurately reflect the current access workload and determining the threshold of hot items by scanning access frequencies of all items is time and resource consuming.

Figure 1:
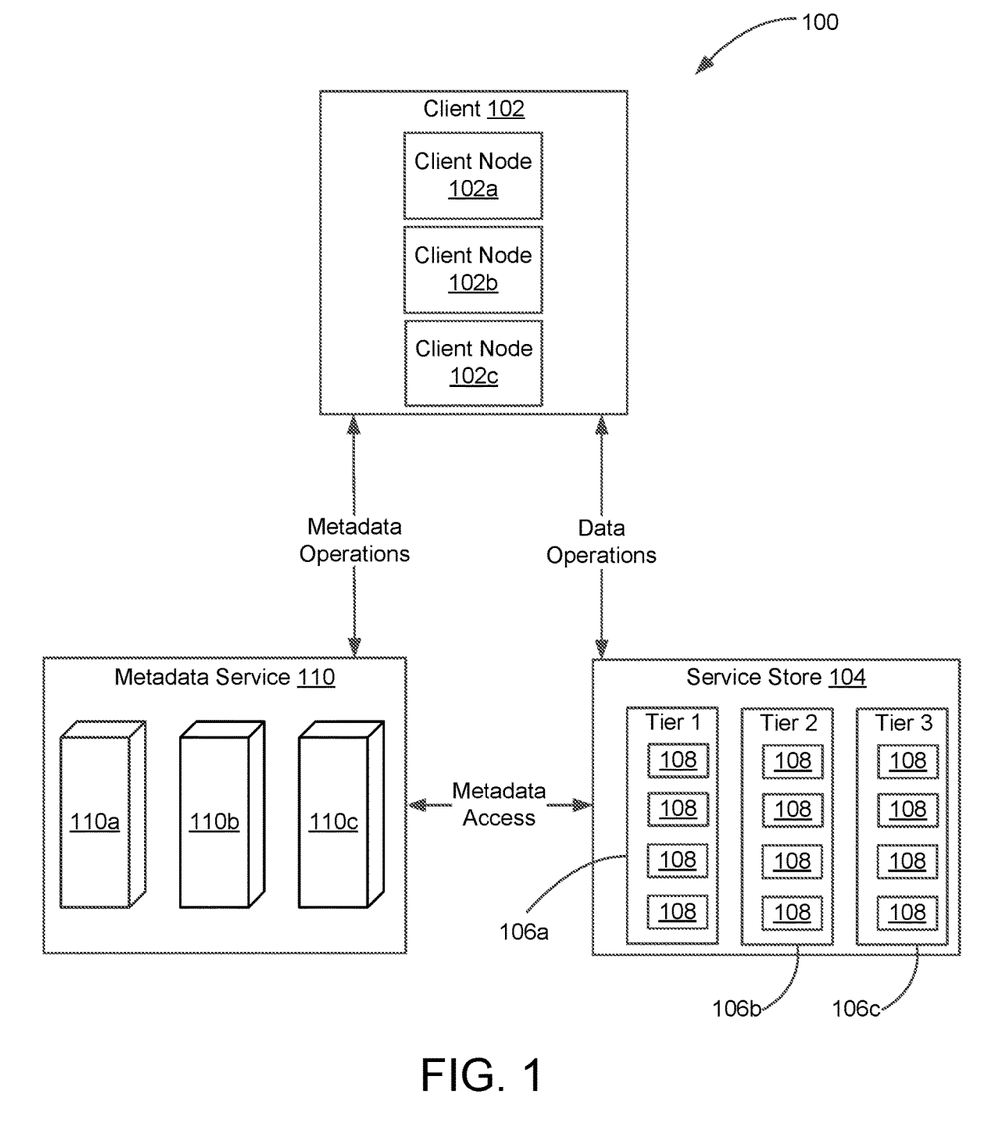
FIG. 1 illustrates a schematic diagram of a distributed storage system in which embodiments disclosed herein may be incorporated.

Embodiments of the disclosure generally relate to using a data sketch-based framework to summarize and query item access frequencies in a distributed storage system and provide a mechanism for hot item identification. FIG. 1 illustrates a simplified diagram of an exemplary distributed storage system 100 in which disclosed embodiments may be incorporated. The distributed storage system 100 shown in FIG. 1 is for illustrative purposes only. Embodiments of the present disclosure are not limited to any particular architecture including the distributed storage system 100 shown in FIG. 1. Rather, embodiments are illustratively practiced within any number of different types of distributed computing architectures including distributed storage systems that are file systems.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Distributed storage system 100 includes a client 102 having client nodes 102a, 102b and 102c. Although three client nodes are illustrated in FIG. 1, there may be any number of client nodes in distributed storage system 100 including a single client node. Distributed storage system 100 includes a service store 104 having a plurality of different data storage technologies located in data storage tiers or pools 106a, 106b and 106c. Located in each data storage tier or pool 106a, 106b and 106c are storage devices 108 of the same type. For example, tier 1 (106a) may include data storage devices 108 that are all NVRAMs, tier 2(106b) may include data storage devices 108 that are all SSDs and tier 3 (106c) may include data storage devices 108 that are all HDDs. Client nodes 102a, 102b and 102c provide an access interface to bridge client applications and service store 104.

Distributed storage system 100 also includes metadata service 110 having metadata servers 110a, 110b and 110c. Although three metadata servers are illustrated in FIG. 1, there may be any number of metadata servers in distributed storage system 100 including a single metadata server. Metadata is data that provides information about other data. In a file distributed storage system, pre-defined metadata structures may be in a tree-like hierarchy, such as metadata including file size, creation time, time it was last accessed, the time the file's metadata was changed or the time the file was last backed up. While in an object-based distributed storage system, metadata severs 110 may provide for full function, custom, object-level metadata. For example, object storage metadata is able to manage application-specific metadata that helps describe an object and help applications understand and analyze an object to gain better input/output (IO) access performance.

Data sketching is a class of streaming algorithms, such as hashing functions ($h_1(o)$, $h_2(o)$, $h_3(o)$) that extract information from a stream of data in a single pass. Data sketches or data summary structures are different from traditional sampling techniques in that sketches or summary structures examine all the elements of a data stream, touching each element only once, and often have a certain form of randomization that forms the basis of their stochastic nature. In object-based distributed storage systems, the elements of a data stream are object accesses (or object IO operations). For example, given three objects (obj1, obj2 and obj3), an exemplary sequence of operations may be create(obj1), create (obj2), create(obj3), write(obj1), read(obj1), write (obj2) and write(obj3). This sequence of IO operations is a data stream S, where each of the object IO operations is an element of the data stream S. Queries on data sketches or data summary structures are executed by a set of estimator algorithms and the returned result is approximate but well established and has mathematically proven error distribution bounds. Data sketches or data summary structures are typically fast, highly parallelizable, approximate and small in terms of memory usage.

Figure 2:
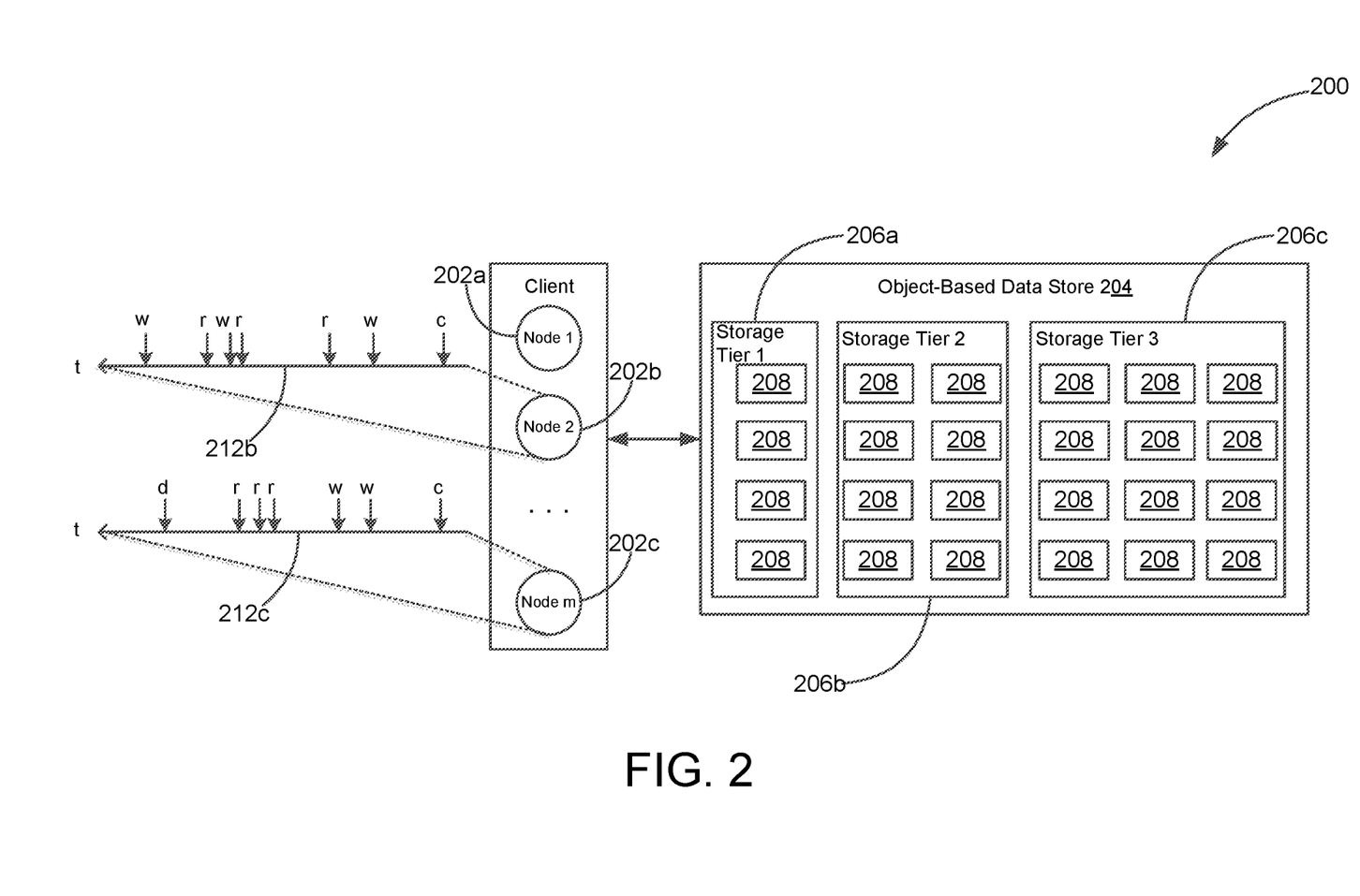
FIG. 2 illustrates a schematic diagram of a data stream of data operations in a distributed storage system according to an embodiment.

FIG. 2 illustrates a simplified diagram of a data stream of data operations in a distributed object storage system 200 according to an embodiment. Distributed storage system 200 wraps data into objects or items that are identified by unique identifiers or hashes. Object-based data storage or service 204 includes storage tier 1 (206a) featuring high performance (high bandwidth and low latency) data storage devices 208, storage *tier* 2 (206b) having data storage devices 208 and storage tier 3 (206c) featuring large capacity with relatively lower performance data storage devices 208. Client nodes 1 (202a), 2 (202b) and m (202c) provide an access interface to bridge client applications and object store or storage tiers 206a, 206b and 206c. As illustrated in FIG. 2, the access interfaces contain APIs (application programming interfaces) that perform data operations (exemplary object access data streams 212b and 212c), such as to create (c), delete (d), write (w) and read (r) objects over a period of time (t). While FIG. 2 illustrates a distributed storage system 200 to explain a data sketch-based framework to summarize and query item access frequencies, the data sketch-based framework may also be applied to an IO middleware as the data sketch-based framework does not require any changes on a service side, such as service 104 (FIG. 1) or 204 (FIG. 2).

Figure 3:
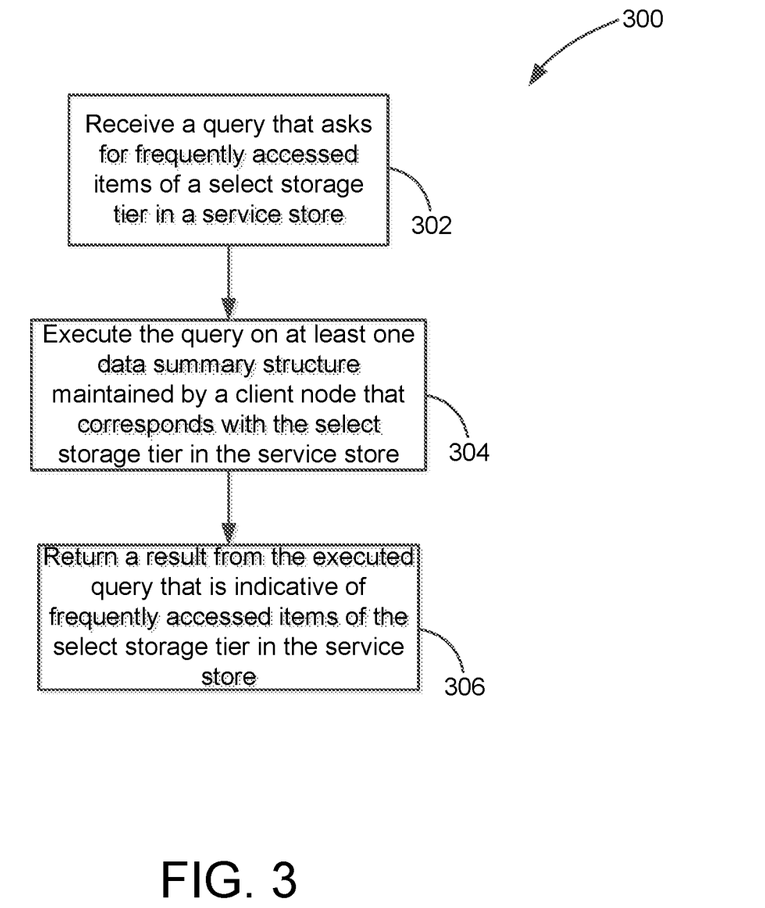
FIG. 3 illustrates a block diagram of a method of identifying hot items in a distributed storage system according to an embodiment.

FIG. 3 illustrates a block diagram of a method 300 of identifying hot items in a distributed storage system, such as distributed storage system 100 in FIG. 1 and distributed storage system 200 in FIG. 2. At block 302, a query is received that asks for access frequency of a select storage tier in a service store. For example, in distributed storage system 100, the query asks for frequently accessed items in a select storage tier, such as storage tier 106a, 106b or 106c, in service store 104. In distributed storage system 200, the query asks for object access frequency in a select storage tier, such as storage tier 206a, 206b or 206c, in object-based data store 204. As previously described, embodiments of the disclosure include the sequence of item or object accesses being modeled on each client node 102a, 102b and 102c or 202a, 202b and 202c as a data stream. In particular, data sketches or data summary structures are used as a framework on the data stream.

A standard data streaming model, such as a turnstile model, may be employed to model the access sequence (data stream) of a storage tier that corresponds with each client node. Given a whole object access (a) stream S with N accesses and O distinct objects, where $O \leq N$, let $S=(a_1, a_2, \ldots, a_N)$, where each object identifier $o_i \in U=(o_1, o_2, \ldots, o_o)$, where U is an object set. Also, let $F=(f_1, f_2, f_o)$ where f represents how frequently object o is accessed. For every operation of object creation, write and read, the frequency of the object being accessed is increased by c: $f_i=f_i+c$. The simplest form is defining c as 1 to increase the object frequency by 1 every time the object is accessed, however, c can also take into account the amount of data accessed. The frequency of the object is removed from F if the object is deleted. Therefore, given a data stream $S=(a_1, a_2, \ldots, a_N)$ and considering the number of objects, maintaining a full set of $F=(f_1, f_2, \ldots, f_o)$ and searching hot objects in the full set of F are extremely expensive in terms of memory consumption and central processing unit (CPU) usage. As explained above, data sketching is exploited in this framework. Therefore, and for example, two different data sketching techniques may be applied to identify hot objects: heavy-hitter hot object identification and quantile-based hot object identification.

The heavy-hitter technique of data sketching has two user-defined parameters, k and $\varepsilon$, of which k is the number of heavy-hitters (frequently accessed items) and $\varepsilon$ is the error control parameter. The number of object accesses, N, is usually very large (in the hundreds of millions, or billions), and k is modest (e.g., 10, 100, or 1000). A heavy-hitter function hh(S, k, $\varepsilon$), which is to output a list of elements such that every element that occurs at least N/k times in object access stream S is in the list, every value in the list occurs at least N/k–$\varepsilon$n times in object access stream S and any object in the output list of hh(S, k, $\varepsilon$) is considered as a hot object. The heavy-hitter technique can be used to output a batch of hot objects at a time.

In the quantile-based technique, the following are defined functions: Freq(o) is the point estimation of the object o's access frequency. Quantile($\varphi$) returns the $\varepsilon$-approximates $\varphi$-quantile over the data stream S where $\varepsilon$ is the error parameter and $0<\varphi\leq1$. The rank of an element is its position in a sorted arrangement of elements N, which are the number of object accesses in the data stream. The rank of the minimum element is 1, while that of the maximum element is N. A quantile is a value that achieves a particular rank. The $\varphi$-quantile is the element (or value) that ranks at number [$\varphi$N] among N elements. Quantile($\varphi$) returns the element whose rank is between [($\varphi$–$\varepsilon$)N] and [($\varphi$+$\varepsilon$)N] with certain probability guarantee. The returned element is called the $\varepsilon$-approximate $\varphi$-quantile. Given the predefined threshold for quantile T ($0<T\leq1$), its $\varepsilon$-approximate quantile is Quantile(T). For an object o, if its access frequency estimation Freq(o) is greater than Quantile(T), the object o is considered a hot object. For example, given an object set $U=[o_1, o_2, \ldots, o_{100}]$ with object access stream $S=(a_1, a_2, \ldots, a_{10000})$ in which $o_1 \in U$, the vector F represents the number object $o_1$ occurs in the stream S. If a threshold T is 0.9, it means that an object is considered to be hot only if its access frequency (estimated by Freq(o)) is greater than access frequencies of 90% of the objects. Compared to the heavy-hitter technique described above, the quantile-based technique allows applications to specify a quantile as a threshold instead of the number of heavy-hitters. These two techniques may be chosen according to the application's usage.

Any data sketch or data summary structure and algorithm may be integrated into embodiments of the framework as long as it provides methods to identify heavy-hitters (hh(S, k, $\varepsilon$), estimate the value of a single element (Freq(o)) and approximate Quantile(T)). One type of sketch or summary structure is the Count-Min sketch. The Count-Min sketch is used to demonstrate how to use data sketches to estimate Freq(o) and Quantile(T). The Count-Min sketch consumes a stream of object access operations and updates the frequency of different objects in the stream for each operation. The Count-Min sketch uses a two-dimensional array of j columns and i rows. Each element in the two-dimensional array records a count. The parameters j and i are fixed when the sketch is created. Associated with each of the i rows is a separate hash function. The hash functions are pairwise independent. A family of hash functions are said to be k-independent, k-wise independent or k-universal if selecting a function at random from the family guarantees that the hash codes of any designated k keys are independent random variables. When an object is accessed, the data sketch or data summary structure is updated as follows: for each row i of the two-dimensional array, the corresponding hash function is applied to obtain a column index $j=h_i(o)$, where o is the object identifier. Then the value in element (i, j) (row i, column j), count(i, j), is incremented by one. At any time, the data sketches or the data summary structures may be queried for the frequency of a particular object (Freq(o)), and the algorithm returns an estimate of this frequency that is within a certain distance of the true frequency, with a certain probability. The estimation of object o's frequency is the minimum of counts of i elements:

$$\min_{0\leq i<d}(count(i, h_i(o))).$$

The $\varepsilon$-approximate $\varphi$-quantiles of object access frequency may also be found and used to query the rank of threshold T. Therefore, the answer to query Freq(o) is guaranteed within some error with certain possibility.

Figure 4:
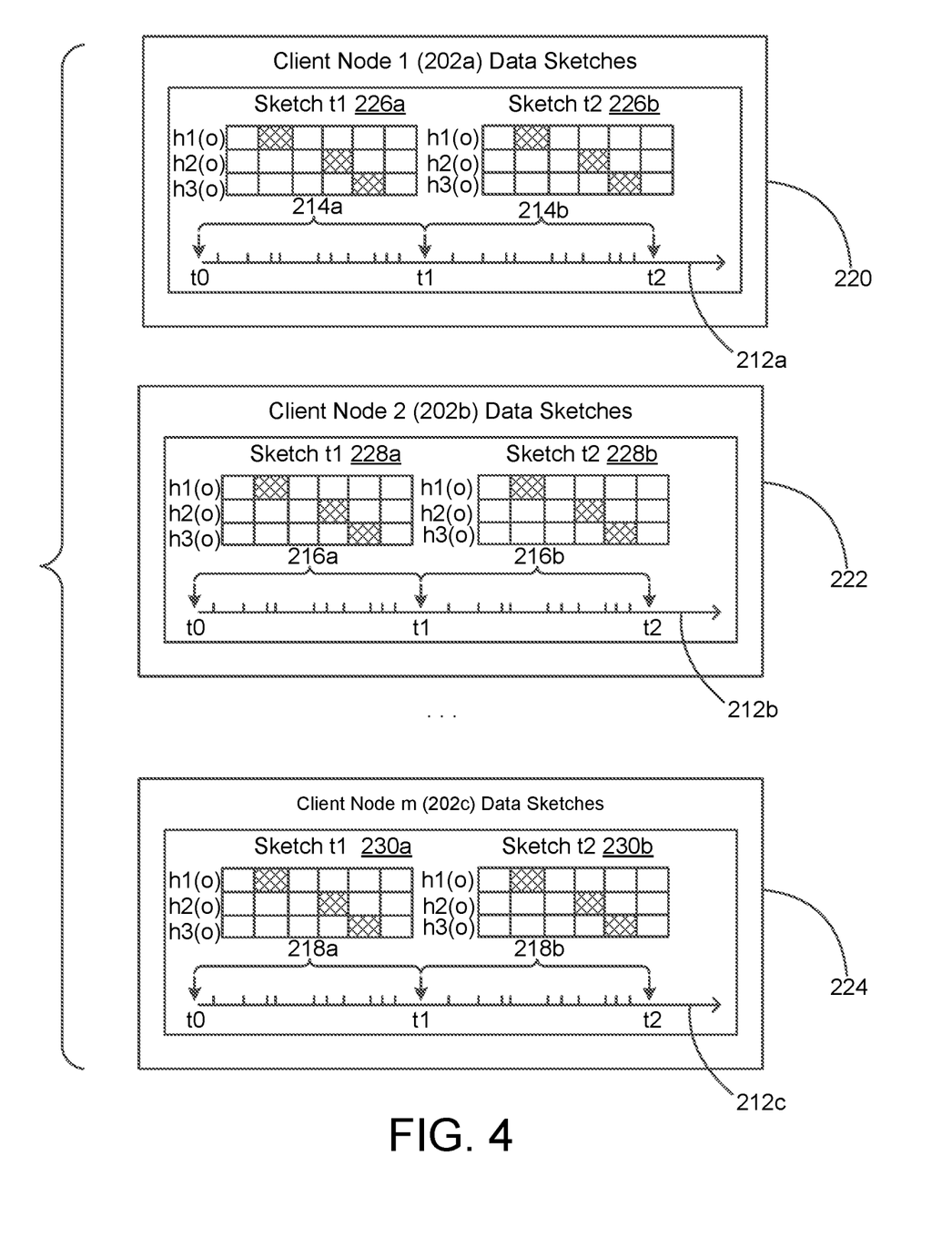
FIG. 4 illustrates a schematic diagram of parallel creation of data summary structures or data sketches at exemplary client nodes in the distributed storage system of FIG. 2 according to an embodiment.

FIG. 4 illustrates parallel creation of data summary structures or data sketches 220, 222 and 224 at exemplary client nodes 202a, 202b and 202c in distributed object storage system 200 according to an embodiment. In the FIG. 4 embodiment, data summary structures or data sketches 220, 222 and 224 are exemplary Count-Min sketches or structures where each sketch 220, 222 and 224 includes a two-dimensional array of columns and rows, and associated with each row, is a hash function ($h_1(o)$, $h_2(o)$, $h_3(o)$, the hash functions use object indentifier, o, as input) and, as described above, for each row i of the two-dimensional array, the corresponding hash function is applied to obtain a column index $j=h_i(o)$, the value in the corresponding element (i, j) is updated to record the element's count. Under one embodiment, each client node 202a, 202b and 202c maintains a separate set of data sketches or data summary structures 220, 222 and 224 of access history for a storage tier or pool 206a, 206b and 206c. Different tiers or pools have different access frequencies. For example, a high performance tier or pool accommodates objects with higher frequency, leading to different parameter settings of data sketches or data summary structures.

Under one embodiment, data sketches for each client node 202a, 202b and 202c are updated when an access request arrives. A large distributed storage system may contain tens, hundreds or even thousands of client nodes. Therefore, it is important for each client node to update its own data sketches and serve any query on access frequency locally without sending requests to other client nodes 202a, 202b and 202c or store 204. In this way, data sketches at each node 202a, 202b and 202c are periodically synchronized or merged together to ensure that each client node keeps up-to-date summaries of, for example, object accesses over the whole object store.

Over time some objects or items eventually grow cold, while new sets of objects or items are created and gradually run hot. This is the result of object or item age and lifetime or change of of workload. Queries on the data sketches or data summary structures should accordingly be restricted to recent data. Under another embodiment, the data sketch framework includes merging sketches or summary, or in other words, using a sliding window mechanism to solve the problem of object aging. The access streams, such as access streams 212a, 212b and 212c, are broken into small windows 214a and 214b, 216a and 216b and 218a and 218b. Each window covers a period of time, for example, a few hours and each window is sketched into a data sketch or data summary structure 226a, 226b, 228a, 228b and 230a and 230b separately. Different windows and corresponding sketches or structures are merged together, and queries are conducted over the merged sketches or structures.

The sliding window mechanism serves applications of distributed storage systems well. Studies in large scale network file system workloads show most of the files have lifetimes longer than a day, with many living well beyond a day. Applications making use of hot items or objects usually target objects with large size and longer lifetime as compared to small objects or items that have short lifetimes (such as seconds or minutes).

Each client node 102a/202a, 102b/202b and 10c/202c manages and updates its data sketches or data summary structures in parallel, reducing the memory consumption and processing overhead in each node. In a typical environment running storage services, such as storage services 104 and 204, nodes are assigned to different jobs accessing different subsets of items or objects. Over time, the summaries captured in the data sketches of each node (node sketches) may differ. As described above, data sketches at each node are merged together. Still further, because data sketch algorithms, such as Count-Min sketches, produce summaries that are mergeable, the sketches or summaries computed from each stream may be quickly combined to obtain a global sketch, which is a summary of object or item access over the whole service store.

Figure 5:
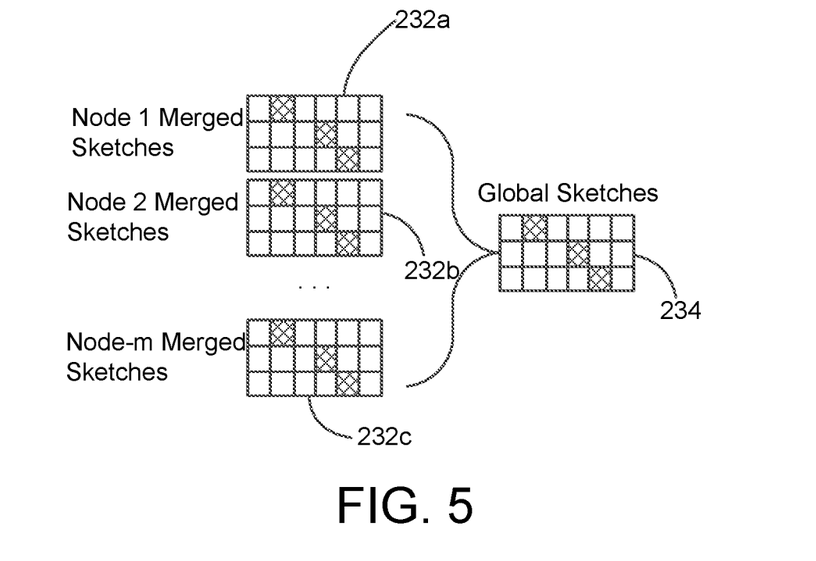
FIG. 5 illustrates a schematic diagram of a global merge of data summary structures or data sketches from a plurality of client nodes in the distributed storage system of FIG. 2 according to an embodiment.

FIG. 5 illustrates merged sketches 232a, 232b and 232c from individual client nodes globally merged into a global sketch 234 according to an embodiment. For example, merged sketch 232a may be computed from merging sketches 226a and 226b together in FIG. 4, merged sketch 232b may be computed from merging sketches 228a and 228b together in FIG. 4 and merged sketch 232c may be computing from merging sketches 230a and 230b together in FIG. 4. Over time the locally maintained data sketches at each node drift away from the "real" summaries of access frequency across the whole system. At a predefined interval ($T_{merge}$), global sketch merging is triggered to synchronize, combine and compute sketches from all nodes into a global sketch 234. $T_{merge}$ is carefully chosen to access characteristics that reflect up-to-date access frequency while avoiding triggering too many merging operations.

Figure 6:
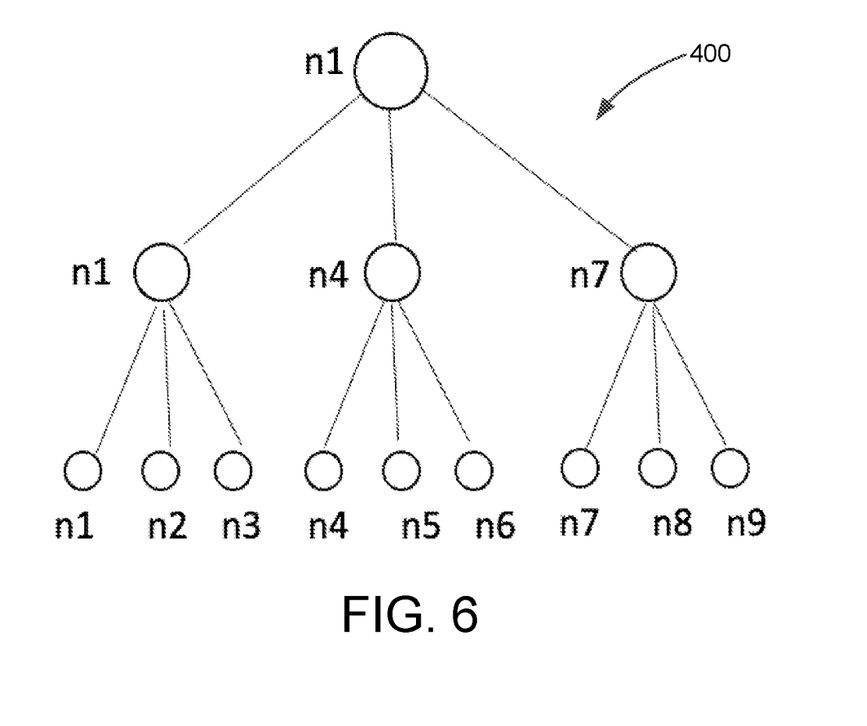
FIG. 6 illustrates a tree-based data sketch merging mechanism according to an embodiment.

FIG. 6 illustrates a tree-based data sketches merging mechanism 400 applied to further reduce CPU and network utilization. In FIG. 6, a d-ary tree is constructed. All client nodes at leaf level 1 (n1-9) are partitioned into groups of d (in FIG. 6, d=3) and one node from each group of d is selected as the leader for each group. The leader nodes are further formed of a group of d at level 1-1 and follow the same construction rule as leaf level 1. The process is continued until a root node (n1) is reached. When merging data sketches, client nodes only send current data sketches to its group leader and the group leader will combine the received data sketches and send merged sketches to its leader at an upper level. Merged sketches are moved up the tree until they reach the root node. The root node computes global sketch 234. After global sketch 234 is computed, the root node sends or broadcasts global sketch 234 to each client node 202a, 202b and 202c by traversing tree-based merging mechanism 400. Each node 202a, 202b and 202c then updates its node sketches to the global sketch 234.

With reference back to FIG. 3, at block 304, the query is executed on a set of data summary structures or data sketches maintained by a client node 102a/202a, 102b/202b, 102c/202c that corresponds with the select storage tier 106a/206a, 106b/206b, 106c/206c in the service store 104/204. As discussed above, each data summary structure maintained by the client node summarizes a data stream of frequently accessed items during a period of time and different data summary structures from different periods of time are periodically merged together so that the query is conducted on a merged data summary structure. At block 306, a result is returned from the query executed on the merged data summary structures that is indicative of hot items or objects of the select storage tier 106a/206a, 106b/206b, 106c/206c in the service store 104/204.

The illustrations of the embodiments described herein are intended to provide a general understanding of the structure and methods of the various embodiments. The illustrations are not intended to serve as a complete description of all of the elements and features of apparatus, methods and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the extent allowed by law, the scope of the present disclosure is to be determined by the broadest permissible interpretation of the following claims and their equivalents, and shall not be restricted or limited by the foregoing detailed description.

What is claimed is:

1. A method of identifying hot items in a distributed storage system having a plurality of storage tiers and a plurality of client nodes corresponding to the plurality of storage tiers, the method comprising:
    summarizing, by a first client node of the plurality of client nodes corresponding to a first storage tier of the plurality of storage tiers, different data streams of item access of the first storage tier from different periods of time to obtain a plurality of different data summary structures;
    merging, by the first client node, the plurality of different data summary structures to obtain a merged data summary structure;
    receiving a query that asks for frequently accessed items of the first storage tier in a service store;
    executing the query on the merged data summary structure maintained by the first client node; and
    returning a result from the executed query that is indicative of the frequently accessed items of the first storage tier in the service store.

2. The method of claim 1, wherein the distributed storage system comprises a distributed object storage system and the frequently accessed items comprise frequently accessed objects.

3. The method of claim 1, wherein the first storage tier comprises data storage devices of a same type of data storage technology.

4. The method of claim 1, wherein frequently accessed items comprise data operations on items of the first storage tier including writing data to the items and reading data from the items.

5. The method of claim 1, wherein each data summary structure of the plurality of different data summary structures comprises a Count-Min structure having a two dimensional array of rows and columns, wherein each row includes a hash function.

6. The method of claim 1, wherein the merged data summary structure from the first client node is further computed into a global data summary structure.

7. The method of claim 6, wherein the global data summary structure is computed at a predetermined interval and merges the merged data summary structure maintained by the first client node and merged data summary structures maintained by other client nodes of the plurality of client nodes.

8. The method of claim 7, wherein the global data summary structure is computed using a tree-based merging mechanism, wherein the tree-based merging mechanism includes a process of partitioning client nodes of the plurality of client nodes and their corresponding merged data summary structures into groups where one of the client nodes and its corresponding merged data summary structure is a leader that merges data summary structures of the group and moves the merged data summary structure of the group up the tree-based merging mechanism until the global data summary structure is computed at a root node of the tree-based merging mechanism.

9. The method of claim 7, wherein the merged data summary structure maintained by the first client node is updated with the global data summary structure upon receipt of a broadcast of the global data summary structure.

10. A method of identifying hot objects in a distributed object storage system having a plurality of storage tiers and a plurality of client nodes corresponding to the plurality of storage tiers, the method comprising:
    in each client node of the plurality of client nodes corresponding to each different storage tier of the plurality of storage tiers, summarizing different data streams of object access of the storage tier from different periods of time to obtain a plurality of different data summary structures;
    in each client node of the plurality of client nodes, merging the plurality of different data summary structures to obtain a merged data summary structure;
    receiving at least one query that asks for frequently accessed objects of one of a plurality of storage tiers in a service store;
    executing the at least one query on the merged data summary structure of one of the plurality of client nodes; and
    returning at least one result from the at least one executed query that is indicative of the frequently accessed objects of the one of the plurality of storage tiers in the service store.

11. The method of claim 10, wherein the merged data summary structures maintained at the plurality of client nodes are further merged together into a global data summary structure.

12. The method of claim 11, wherein the global data summary structure is computed at predetermined intervals.

13. The method of claim 11, wherein the global data summary structure is computed using a tree-based merging mechanism, wherein the tree-based merging mechanism includes a process of partitioning client nodes and their corresponding merged data summary structures into groups where one of the client nodes and its corresponding merged data summary structure is a leader that merges data summary structures of the group and moves the merged data summary structure of the group up the tree-based merging mechanism until the global data summary structure is made at a root node of the tree-based merging mechanism.

14. The method of claim 11, wherein each merged data summary structure maintained by each client node is updated with the global data summary structure upon receipt of a broadcast of the global data summary structure.

15. A distributed storage system comprising:
    a service store including a plurality of storage tiers;
    a plurality of client nodes each corresponding with one of the plurality of storage tiers in the service store, with each client node configured to;:
        summarize different data streams of item access of the storage tier from different periods of time to obtain a plurality of different data summary structures;
        merge the plurality of different data summary structures to obtain a merged data summary structure;

receive a query that asks for frequently accessed items of the storage tier;

execute the query on the merged data summary structure; and return a result from the executed query that is indicative of the frequently accessed items in the storage tier.

16. The distributed storage system of claim 15, wherein each storage tier comprises data storage devices of a same type of data storage technology.

17. The distributed storage system of claim 15, wherein each data summary structure comprises a Count-Min structure having a two dimensional array of rows and columns, wherein each row includes a hash function.

18. The distributed storage system of claim 15, wherein the merged data summary structures from the client nodes are further computed together into a global data summary structure at a predetermined interval.

19. The distributed storage system of claim 18, wherein each merged data summary structure maintained by each client node is updated with the global data summary structure upon receipt of a broadcast of the global data summary structure.

20. The distributed storage system of claim 18, wherein the global data summary structure is computed using a tree-based merging mechanism, wherein the tree-based merging mechanism is configured to partition client nodes and their corresponding merged data summary structures into groups where one of the client nodes and its corresponding merged data summary structure is a leader that merges data summary structures of the group and moves the merged data summary structure of the group up the tree-based merging mechanism until the global data summary structure is computed at a root node of the tree-based merging mechanism.

* * * * *